United States Patent [19]

Dalton et al.

[11] Patent Number: 5,487,549
[45] Date of Patent: Jan. 30, 1996

[54] TURBINE INTERFITTING PACKING WITH CAM ADJUSTMENT

[75] Inventors: William S. Dalton; Patrick S. Dalton, both of Chesterfield; Richard S. Clark, Feeding Hills, all of Mass.

[73] Assignee: Demag Delaval Turbomachinery Corp. TurboCare Division, Chicopee, Mass.

[21] Appl. No.: 328,016

[22] Filed: Oct. 24, 1994

[51] Int. Cl.$^6$ ................................................. F16J 15/447
[52] U.S. Cl. .......................... 277/54; 277/154; 415/174.5
[58] Field of Search ............................... 277/53, 54, 126, 277/147, 154, 199, 221; 415/173.2, 173.5, 174.1, 174.5

[56] References Cited

U.S. PATENT DOCUMENTS

| | | |
|---|---|---|
| 436,652 | 9/1890 | Eastman . |
| 793,523 | 6/1905 | Bowen . |
| 1,011,671 | 12/1911 | Thompson . |
| 1,855,890 | 4/1932 | Phillips . |
| 1,916,451 | 7/1933 | Watson . |
| 2,239,637 | 4/1941 | Zesewitz . |
| 2,686,657 | 8/1954 | Kalitinsky . |
| 2,908,516 | 10/1959 | Stein . |
| 3,357,708 | 12/1967 | Parr . |
| 3,411,794 | 11/1968 | Allen ..................... 415/174.5 |
| 3,663,023 | 5/1972 | Leidenfrost . |
| 3,728,041 | 4/1973 | Bertelson . |
| 3,768,817 | 10/1973 | Daniels . |
| 4,050,702 | 9/1977 | Delmatto . |
| 4,386,785 | 6/1983 | Back . |
| 4,394,022 | 7/1983 | Gilmore . |
| 4,714,404 | 12/1987 | Lardellier ............... 415/173.2 |
| 4,758,005 | 7/1988 | Fox . |
| 4,907,812 | 3/1990 | Meyer . |
| 5,002,288 | 3/1991 | Morrison et al. ........ 415/174.5 |
| 5,009,437 | 4/1991 | Back . |
| 5,362,072 | 11/1994 | Dalton ........................ 277/54 |
| 5,374,068 | 12/1994 | Jewett et al. ................ 277/54 |

*Primary Examiner*—Scott W. Cummings
*Attorney, Agent, or Firm*—Ross, Ross & Flavin

[57] ABSTRACT

In an elastic fluid turbine employing a segmented packing ring mounted in a ring-like stationary holder or diaphragm having upper and lower half-parts which meet at a horizontal joint and circumscribe a rotor to minimize leakage between the components, interfitting butt ends on certain of the packing ring segments at the diaphragm horizontal joint, and cam pins on the diaphragm at the horizontal joint and engageable with slots in said certain of the packing ring segments for accurately positioning the packing ring segments relative to the horizontal joint.

1 Claim, 2 Drawing Sheets

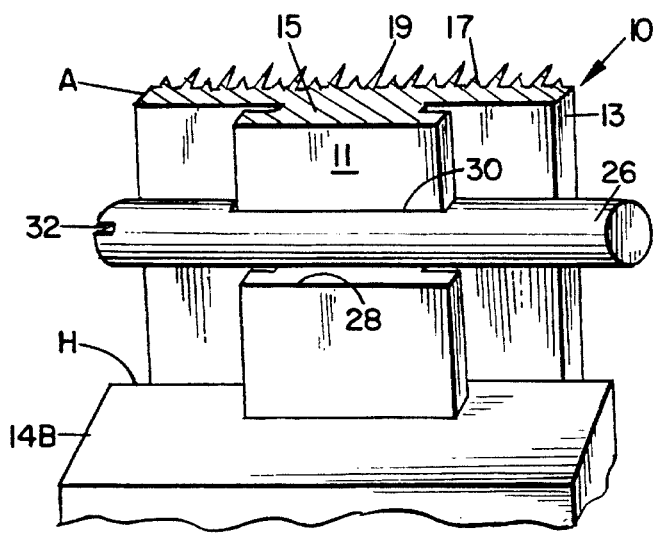
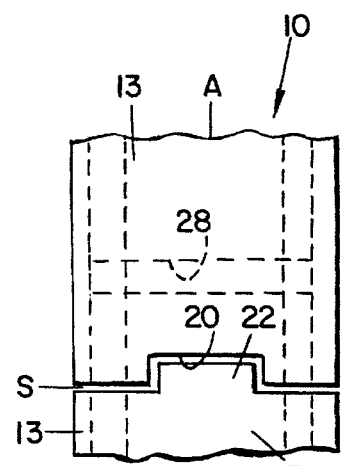
FIG. 3.
FIG. 7.
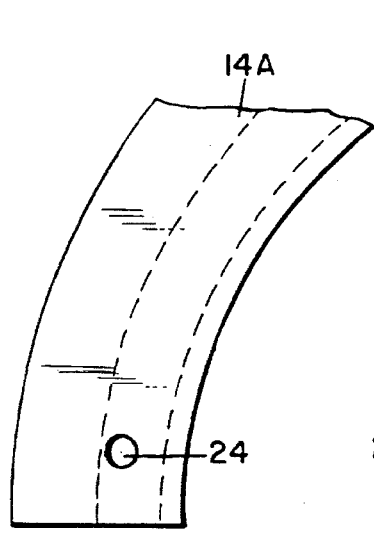
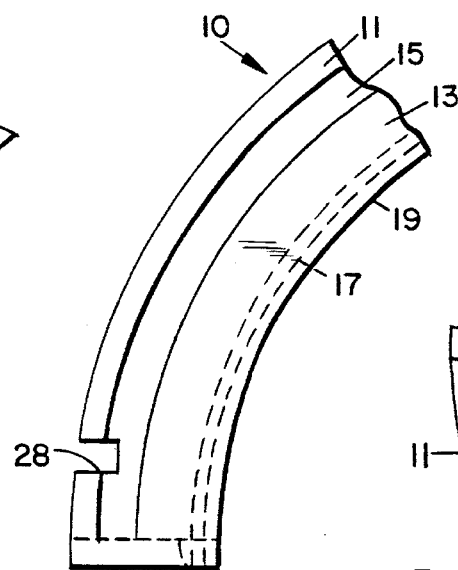
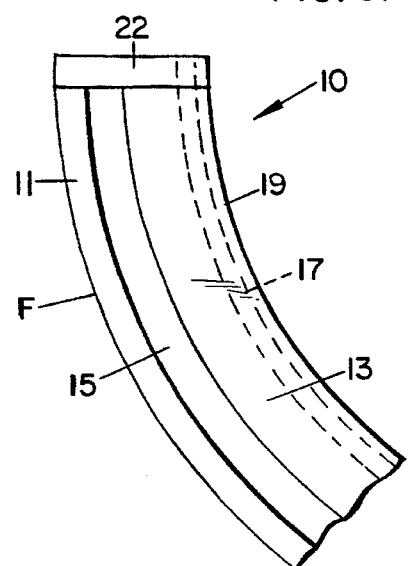
FIG. 4.
FIG. 5.
FIG. 6.
FIG. 8.

TURBINE INTERFITTING PACKING WITH CAM ADJUSTMENT

BACKGROUND OF THE INVENTION

FIELD OF THE INVENTION

The invention relates to sealing means such as labyrinth seal packing rings for the diaphragm and other stationary parts of an eleastic fluid axial flow turbine. Such sealing means are arranged where rotatable shafts penetrate stationary turbine casings. The sealing means prevent or reduce leakage of the fluid by creating small clearance areas with low flow coefficients between the rotating and stationary parts.

DESCRIPTION OF THE PRIOR ART

It has been common practice for years when installing new segmented labyrinth seals (packing rings) as used in steam turbines, to measure and cut the butt ends of the segments in the field. Pin slots/key slots are also cut at the same time. The need to cut the butt ends at all is due to the difference in the coefficient of thermal expansion of the packing ring material vs the expansion rate of the packing ring holder (diaphragm). The pin slot/key slots which are only cut in the upper half of the ring have two purposes: 1) to keep the upper half from falling out of the diaphragm and 2) to act as an anti-rotation device.

Measuring and cutting of the butt ends is critical for both standard as well as for retractable type packing. If the packing ring butt ends are not measured and cut correctly, one of two things will occur: 1) the packing ring butt ends will not close at operating temperature leaving an excessive gap, which will allow steam to escape through the butt ends causing a loss of energy and the possibility of erosion at the butt area, and 2) the possibility that as the temperature increases and each segment grows in length, the butt ends will come into contact with each other. If this contact exceeds —O— it will push the ring to a larger diameter, increasing the radial clearance, which is undesirable.

Using the example of a 30" diameter bronze packing ring in a Cr-Mo holder or diagragm operating at a temperature of 750° F., the coefficient of thermal expansion of the bronze packing ring is Bronze $9.4(10^{-6})$ while that of the Cr-MO diaphragm is Cr-Mo $7.5(10^{-6})$.

A bronze bar operating at a temperature of 750° F. will have grown 0.134 longer than a Cr-Mo bar. Therefore, to have both bars be the same length at the operating temperature, it would be necessary to shorten the bronze bar by 0.134" when at ambient temperature.

If we now look at what would happen to a 30" diameter ring if we fail to cutt the butt ends, the bronze ring will have grown 0.043 in diameter larger than its Cr-Mo holder. If we had not cut the butt ends in this example the radial clearance for each side would have increased by 0.043"÷2=0.0215". If, for example, our design radial clearance calls for 0.025", and our packing is set for this clearance at ambient, temperature, at operating temperature of 750° F. our radial clearance would have increased to 0.025"+0.0215"=0.0465".

As can be seen from the above if the packing ring butt ends are not measured and cut correctly, a great deal of energy can be lost due to extra large radial clearance.

Standard procedure for measuring and cutting packing butt ends is always a field operation. It is very time consuming, expensive and prone to error. It has been our experience that precutting in the factory does not work well, due to diaphragm distortion, excessive oxide build up on fit area, diaphragm dishing and others.

In addition to the measuring and cutting of butt ends, the location of pin slots/key slots in the packing ring segments, while not critical for standard packing, is critical for retractable type packing.

When installing standard packing the location of the pin slots is not critical since the pin or key is only used to keep the packing from falling out of the diaphragm when the diaphragm is inverted during assembly and in some cases to prevent the packing from rotating in its holder.

Retractable packing on the other hand requires that the pin slots or keyways be accurately located for the reasons described below.

The upper half of retractable packing is designed to be held in its proper location by a pin. Spring forces are designed based on the packing pin slot resting on the pin. This design is necessary because without the pin supporting the weight of the packing, the springs in a 6-segment ring force the two top side segments directly against the two bottom segments. If the top segments were not supported by the pins as described above, the top segments could not be held up and away from the rotor, and the bottom segments would be forced back away from the rotor by not only the designed spring forces but also by the weight of the top side segments, and the spring forces of the top segments. This would create a situation where the very top segment would always be closed, and where the very bottom segment might never close.

For the reasons described above it should be apparent that the location of the pin slots in the packing is critical, and some way of allowing for a fine adjustment at assembly in the field would be highly desirable.

SUMMARY OF THE INVENTION

The problems of the segment butt ends are solved herein by the use of interfitting butt ends achieved by pre-cutting at the factory a slot in the lower end of the upper half packing ring segments at the horizontal joint and providing a protrusion on the upper end of the lower half packing ring segments at the horizontal joint on both sides.

The interfitting butt end packing ring segments are designed in such a manner as to create a labyrinth type seal at the horizontal joint on both sides of the rotor. The labyrinth seal has enough clearance to allow for the minimum of leakage and a large enough clearance to allow for free movement between the slot and the protrusion. This new butt end design works in such a way that a closed butt end situation would never be allowed to occur. In fact, the ideal condition would be to have a minimum of 0.062" gap when the packing ring is at its operating temperature and in the closed condition.

The procedure for manufacturing an interfitting ring differs only slightly from the present method as follows:

1. the two segments having a protrusion are cut to a longer chord length;

2. the other four segments are cut to a normal chord length;

3. the segments with the slot and protrusion are machined to create an interfit;

4. the rings are then banded in a normal manner. A 0.062" shim is installed at the interfit on both sides, at all other butt ends a shim ¼ the calculated total butt clearance is installed; and 5. the banding is complete and machining is then done in a normal manner.

When the machining is complete the banding and shims are removed. The ring is now complete. The 0.125" excess butt in the interfitting area allows for any diaphragm problem and the interfit acts as a labyrinth seal reducing the steam flow through this area to a minimum. The 0.125" also allows for any miscalculation that may occur due to incorrect temperature or incorrect materials. It should be noted that while 0.125" has been used, this dimension can be increased or decreased as the case may require.

The design of the interfit is preferably of a wedge type to allow for a self centering condition when the top half diaphragm is loaded onto the lower half.

Also, by the nature of the protrusion through the horizontal joint the interfit will reduce to a minimum any spalling of the horizontal joint of the diaphragm.

The problems of the pin slots/key slots for retractable packing are solved herein by providing, in addition to interfitting butt ends, a means for making the location of the pin slots adjustable so that the pin slots can also be pre-cut at the factory.

Herein, rotatable cam type pins are used to accurately locate the packing ring segments relative to the holder or diaphragm.

To determine the placement of the pin slot in the packing ring, a pin is inserted in the diaphragm pin hole.

Then, using a depth micrometer, the distance from the horizontal joint of the diaphragm to the top side of the pin is measured at both sides of the diaphragm.

By using these measurements, the exact location of the pin slots to be cut in the packing can be calculated.

Field installation of a segmented retractable packing ring using interfitting butts and a cam type pin is accomplished in the following manner. First, the three top half segments are loaded into the top half of the diaphragm. Coil type springs are omitted for the time being. Wooden wedges are used to wedge the packing into its fully closed operating position. The required butt clearances are determined for the given location. As an example, let us say that this is a bronze ring and a 0.100 total butt clearance is required.

It is known that in order for the butt ends of the packing segments to be closed at the operating temperature, there must be a total butt clearance of 0.100 when the packing is at room temperature. The butt ends can only be set in four locations, two in the top half and two in the bottom half. In order to know what size shim or feeler gauge to use at each location, the total butt clearance is divided by 4:

0.100"÷4=0.025"

With the packing in the top half of the diaphragm and the packing in the fully closed condition a cam type pin is installed on both sides. Using a 0.025" shim or feeler gauge a shim is inserted between segments 5—5 and also between segment 6—6. Using a screw driver, the two pins are rotated until there is a light fit on the shims. At the butt ends of the segments at the horizontal joint in the upper half of the interfitting packing, make certain that the butt ends are within ± 0.060" of the horizontal joint of the diaphragm. If the above dimensions are correct, the pin is locked on one side by peening and the other pin is removed. Before removal of the second pin it is marked in such a manner that it can be re-installed in the correct orientation.

All wedges are now removed, the segments are separated, coil type springs are installed, and the pin is reinserted and rotated to the correct orientation and staked. The upper half packing is now installed complete. At operating temperature and in the closed position there is a —O— butt clearance.

The bottom half packing is installed using the same procedure as used in the installation of the top half except that there are no pins required. Again the packing is installed using wooden wedges, with coil type springs omitted, making certain that the 0.025" shims are installed in the two locations between segments 2—2 and segments 3—3. Now, using wooden wedges, make certain that the packing is pushed to fully closed operating position. The lower half packing will have a protrusion at each horizontal joint. The relationship of the horizontal joint of the packing at the base of the protrusion to the horizontal joint of the diaphragm is measured and the measurements recorded.

The upper half measurements are compared with the lower half measurement. The ideal situation would be to have the following type measurements.

| Top Left | Top Right | Bottom Right | Bottom Left | Total |
|---|---|---|---|---|
| −.020 | −.020 | −.020 | −.020 | −.080 |

This would indicate that if the interfit was designed to have 0.062" gap on each side 0.125" total we would have a total labyringh gap of 0.080"+0.125"=0.205" or a gap of 0.102" on each side.

On the other hand if all of the above numbers were pluses then we would have a labyrinth gap of 0.125"−0.080"−0.045" total or each side would= 0.022". As can be seen from the above a labyrinth seal with clearance is produced so that A+O butt condition cannot occur. If the above calculations do not allow for the proper clearance, there is too much butt clearance. The lower two segments can be cut in the normal manner to fit.

BRIEF DESCRIPTION OF THE DRAWING

FIG. 3 is an enlarged, fragmentary, part sectional, perspective view of a packing ring upper segment, with an adjustable cam pin in the packing ring pin slot, the packing ring extending upwardly from the lower diaphragm half-part;

FIG. 4 is a fragmentary, front elevational view of one end of the upper diaphragm half-part and showing a cam pin hole;

FIG. 5 is a fragmentary, front elevational view of one end of one of the upper packing ring segments and showing a cam pin slot and protrusion slot;

FIG. 6 is a fragmentary, front elevational view of one end of one of the lower packing ring segments and showing an end protrusion;

FIG. 7 is a fragmentary rear elevational view of upper and lower interfitting packing ring segments, with the packing ring teeth omitted for clarity; and FIG. 8 is a front elevational view of the cam pin of the invention.

DESCRIPTION OF THE PREFERRED EMBODIMENT

Figure 1:
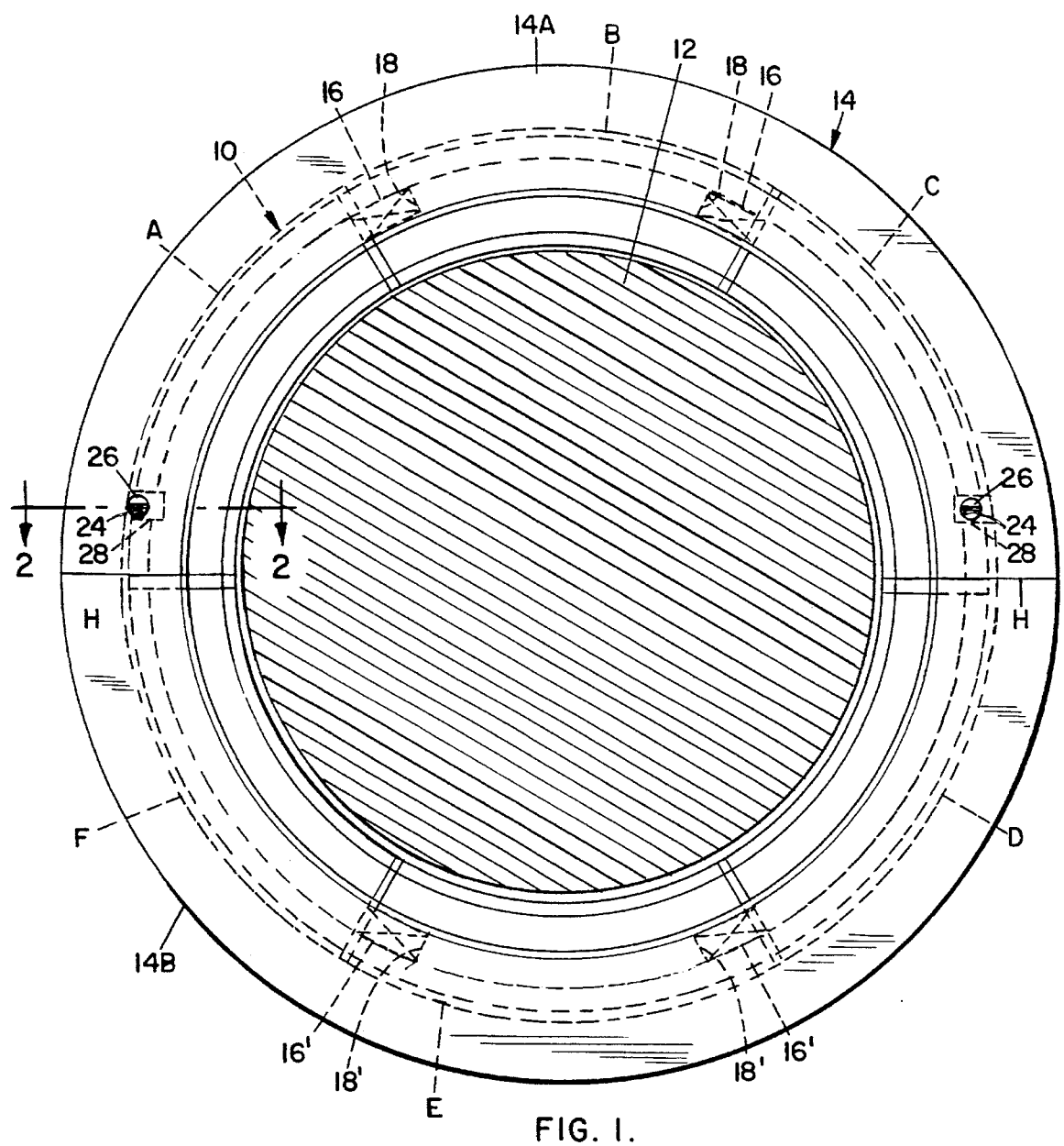
FIG. 1 is a front elevational, part sectional view of an interfitting packing ring with cam adjustment embodying the invention disposed in a packing holder or diaphragm and circumscribing a turbine rotor.

Referring to FIG. 1, a packing ring 10 embodying the invention includes arcuate segments A–F which are arranged end-to-end to form a 360° circle.

Packing ring 10 is held in closely spaced, circumscribing relation to a turbine rotor 12 by a ring-like packing ring holder or diaphragm 14 which includes upper and lower half-parts 14A and 14B respectively, which meet at a horizontal joint H.

Compression springs 16 are disposed in slots 18 in the opposite ends of upper ring segment B and contact the adjacent ends of upper ring segments A and C.

Compressions springs 16' are disposed in slots 18' in the opposite ends of lower ring segment E and contact the adjacent ends of lower ring segments D and F, all for purposes to appear.

Figure 2:
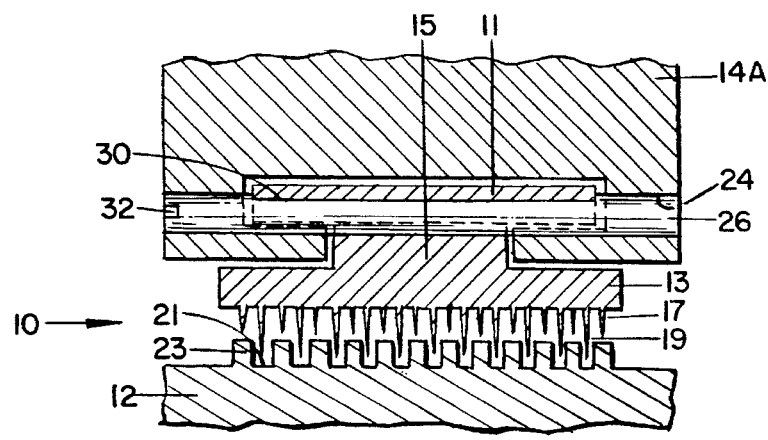
FIG. 2 is a cross sectional view taken on line 2—2 of FIG. 1.

As best seen in FIGS. 2 and 3, each packing ring segment A–F of packing ring 10 has a T-shaped outer portion 11 and an inner portion 13 connected by a central neck 15 to outer portion 11.

Inner portion 13 of the packing ring segment includes a plurality of spaced, parallel, stepped inwardly-extending teeth 17 and 19 which are disposed in opposition to circumferential portions 21 and 23, respectively, of rotor 12 and which are disposed in spaced parallelism to each other and are alternately stepped up and down in radius.

As best seen in FIGS. 5–7, each of the upper ring segments A and C is provided with a cut-out 20 which extends into its lower or butt end across its width and each of the lower ring segments D and F is provided at its upper or butt end with a complementary protrusion 22 which extends across its width for interfitting with the cut-out 20 of the respective adjacent upper ring segments A and C.

The interfitting butt end packing ring segments A, F and C, D are designed in such a manner as to create a labyrinth type seal at the horizontal joint H of the diaphragm on both sides. The labyrinth seal has enough clearance to allow for the minimum of leakage and a large enough clearance to allow for free movement between butt end slots and the butt end protrusions. This new butt end design works in such a way that a closed butt end situation would never be allowed to occur. In fact, the ideal condition would be to have a minimum of 0.062" gap S as shown in FIG. 7 when the packing ring is at its operating temperature and in the closed condition.

Diaphragm upper half-part 14A is provided adjacent each of its ends with a pin hole 24 which extends transversely through the diaphragm, each pin hole 24 having a cam pin 26, to be described, disposed therein.

Each of the upper ring segments A and C is provided with a cam pin slot 28 which extends inwardly from the outer periphery of the segment so as to be disposed in alignment with the axis of the adjacent cam pin hole 24 in diaphragm half-part 14A with the cam pins passing through cam pin slot 28.

Each cam pin 26 is provided on a portion of its periphery with a cam surface 30 and is slotted at its outer end at 32 for easy rotation as by a screw driver.

Cam pins 26 are used to accurately locate and position packing ring segments A and C relative to holder or diaphragm upper half-part 14A.

To determine the placement of pin slots 28 in packing ring segments A and C pins 26 are inserted in diaphragm pin holes 24 and rotated to properly position the diaphragm relative to rotor 12. Then, using a depth micrometer the distance from horizontal joint H of diaphragm 14 to the top side of each pin 26 is measured at both sides of the diaphragm.

By using these measurements, the exact location of pin slots 28 to be cut in the packing segments can be calculated, wherefore the pins slots can be pre-cut at the factory.

We claim:

1. In an elastic fluid turbine employing packing ring segments mounted in a ring-like stationary holder or diaphragm having upper and lower half-parts which meet at a horizontal joint and circumscribe a rotor to minimize leakage between the components, the improvements which comprise means for interfitting the butt ends of certain of the packing ring segments at the diaphragm horizontal joint comprising slots in the butt ends of said certain of the packing ring segments located in the diaphragm upper half-part and protrusions on the butt ends of said certain of the packing ring segments located in the diaphragm lower half-part, the protrusions being engageable with the slots in interfitting manner at the diaphragm horizontal joint, and cam means on the diaphragm adjacent the horizontal joint and engageable with said certain of the packing ring segments for accurately positioning the packing ring segments relative to the horizontal joint, said cam means comprising cam pins mounted for rotation in pin holes in the diaphragm in the upper half part adjacent each end thereof and located upwardly of the horizontal joint, the cam pins extending through a cam slot in said certain of the packing ring segments, each cam pin having a cam surface engageable with the cam slot in the packing ring segment.

* * * * *